(12) United States Patent
Graham

(10) Patent No.: US 9,727,740 B2
(45) Date of Patent: Aug. 8, 2017

(54) SECURE INFORMATION ACCESS OVER NETWORK

(75) Inventor: Christoph J Graham, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/364,695

(22) PCT Filed: Jan. 30, 2012

(86) PCT No.: PCT/US2012/023153
§ 371 (c)(1),
(2), (4) Date: Jun. 12, 2014

(87) PCT Pub. No.: WO2013/115773
PCT Pub. Date: Aug. 8, 2013

(65) Prior Publication Data
US 2014/0304832 A1     Oct. 9, 2014

(51) Int. Cl.
*G06F 21/60* (2013.01)
*G06F 21/85* (2013.01)
*G06F 21/57* (2013.01)
*G06F 21/62* (2013.01)
*H04L 29/06* (2006.01)

(52) U.S. Cl.
CPC .......... *G06F 21/60* (2013.01); *G06F 21/572* (2013.01); *G06F 21/6209* (2013.01); *G06F 21/85* (2013.01); *H04L 63/101* (2013.01); *G06F 2221/2143* (2013.01); *H04L 63/0876* (2013.01)

(58) Field of Classification Search
CPC .... G06F 21/60; G06F 21/572; G06F 21/6209; G06F 21/85; G06F 21/305; G06F 21/88; H04L 63/101; H04L 41/28
See application file for complete search history.

(56) References Cited

U.S. PATENT DOCUMENTS

| | | | |
|---|---|---|---|
| 7,047,405 B2 * | 5/2006 | Mauro ................ | G06Q 20/367 380/270 |
| 7,484,099 B2 | 1/2009 | Bade et al. | |
| 7,565,685 B2 | 7/2009 | Ross et al. | |
| 7,900,058 B2 | 3/2011 | Mabayoje et al. | |
| 2005/0235141 A1 | 10/2005 | Ibrahim et al. | |
| 2009/0249073 A1 | 10/2009 | Wiseman et al. | |

(Continued)

FOREIGN PATENT DOCUMENTS

| CN | 1504057 | 6/2004 |
|---|---|---|
| CN | 101010656 | 8/2007 |

(Continued)

OTHER PUBLICATIONS

International Search Report and Written Opinion, International Application No. PCT/US2012/023153, Date of Mailing: Oct. 8, 2012, pp. 1-7.

*Primary Examiner* — Carl Colin
*Assistant Examiner* — Vance Little
(74) *Attorney, Agent, or Firm* — HP Inc. Patent Department

(57) ABSTRACT

Embodiments herein relate to accessing secure information over a network. The secure information is read and/or modified based on a request received over the network, regardless of an operating state of an operating system (OS) of the device and/or a power state of the device.

13 Claims, 4 Drawing Sheets

(56) References Cited

U.S. PATENT DOCUMENTS

| | | | |
|---|---|---|---|
| 2009/0292919 A1 | 11/2009 | England | |
| 2010/0037296 A1 | 2/2010 | Silverstone | |
| 2010/0037323 A1* | 2/2010 | Lemieux | G06F 21/88 726/26 |
| 2010/0162368 A1* | 6/2010 | Aissi | G06F 21/6209 726/5 |
| 2010/0191947 A1 | 7/2010 | Shin | |
| 2010/0250970 A1 | 9/2010 | Ejiri | |
| 2011/0055891 A1 | 3/2011 | Rice | |
| 2011/0289306 A1 | 11/2011 | Khosravi et al. | |
| 2012/0017271 A1* | 1/2012 | Smith | G06F 9/4401 726/19 |

FOREIGN PATENT DOCUMENTS

| | | |
|---|---|---|
| CN | 101488092 | 7/2009 |
| CN | 102255888 | 11/2011 |
| TW | 200715108 A | 4/2007 |
| TW | 201121280 A1 | 6/2011 |
| TW | I353766 | 12/2011 |
| WO | WO-2009/051471 A2 | 4/2009 |

* cited by examiner

SECURE INFORMATION ACCESS OVER NETWORK

BACKGROUND

Parties may communicate over a computing network. For example, a host may provide a service to a client over the network. Further, the parties may share confidential information, such as keys for cryptography or digital certificates. Sometimes, a first party may seek to access or modify the confidential information stored at a computing platform of a second party over the network. However, complications may occur at the computing platform of the second party, thus preventing the first party from accessing or modifying the confidential information.

For example, the second party may have difficulty communicating with an operating system (OS) of the first party or the OS of the first party may first require on-site approval from a user, such as by physical entry of a pin or password, before allowing remote access to the confidential information. Manufacturers, vendors, and/or users are challenged to provide more effective methods for allowing access to the confidential information over the network without comprising an integrity or security of the computing platform.

BRIEF DESCRIPTION OF THE DRAWINGS

The following detailed description references the drawings, wherein.

DETAILED DESCRIPTION

Specific details are given in the following description to provide a thorough understanding of embodiments. However, it will be understood by one of ordinary skill in the art that embodiments may be practiced without these specific details. For example, systems may be shown in block diagrams in order not to obscure embodiments in unnecessary detail. In other instances, well-known processes, structures and techniques may be shown without unnecessary detail in order to avoid obscuring embodiments.

A first party may seek to access or modify the confidential information stored at a computing platform of a second party over a network. For example, an administrator or host may seek to remotely update confidential or proprietary information, such as software or data, of a client device. For instance, the administrator may seek to populate the client device with a new digital certificate or clear all existing private user data. Generally, the administrator may communicate over the network with an operating system (OS) of the client device to access or modify the confidential information at the client device.

However, complications may occur at the client device. For instance, the OS of the client device may malfunction or the client device may not be powered on, thus preventing the administrator from accessing or modifying the confidential information. Also, the OS may first require on-site approval from a user, such as by physical entry of a pin or password at the client device, before allowing remote access to the confidential information. Further, allowing the OS to access the confidential information may decrease an integrity or security of the confidential information stored at the client device.

Embodiments may allow for greater access to the confidential information while maintaining an integrity or security of the confidential information. For example, embodiments may allow access to the confidential information stored at a device over a network, regardless of an operating state of an operating system (OS) of the device and a power state of the device. Thus, the confidential information may, for example, be managed, migrated, updated and like, even if the device is powered down or the OS is malfunctioning.

Further, as the OS is not involved in accessing the confidential information, security or integrity of a computing platform of the device may be improved. In addition, a user of the device may not be required to be physically present or even notified, before accessing the confidential information, thus providing greater convenience to the user using the device as well as to a remote party seeking to access the confidential information.

Figure 1:
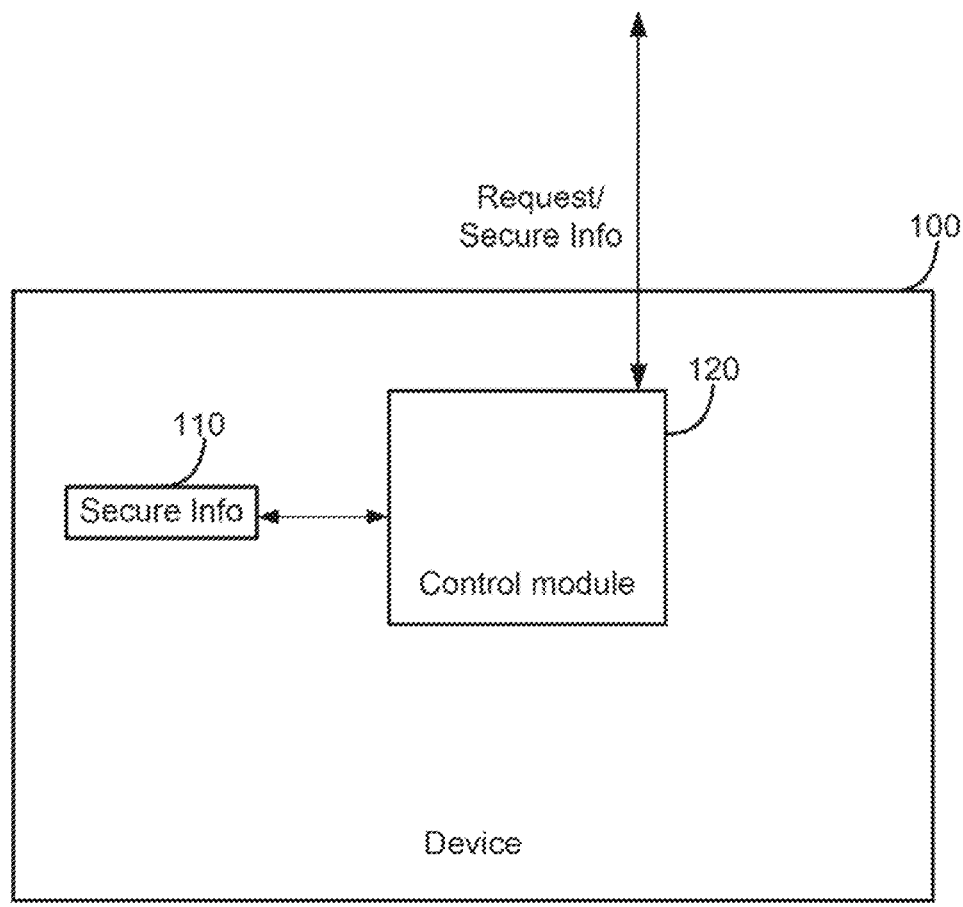
FIG. 1 is an example block diagram of a device for accessing secure information.

Referring now to the drawings, FIG. 1 is an example block diagram of a device 100 for accessing secure information 110. The device 100 may be included in any type of user device to connect to a network (not shown), such as a secure microprocessor, a notebook computer, a desktop computer, an all-in-one system, a slate computing device, a portable reading device, a wireless email device, a mobile phone, and the like. In the embodiment of FIG. 1, the device 100 includes a control module 120 and the secure information 110.

The control module 120 may include, for example, a hardware device including electronic circuitry for implementing the functionality described below, such as control logic and/or memory. In addition or as an alternative, the control module 120 may be implemented as a series of instructions encoded on a machine-readable storage medium and executable by a processor.

The secure information 110 may include any type of confidential information. Examples of the secure information 110 may include a key, a certificate, information associated with platform security of the device 100, cryptographic information, private user data, and the like. The control module 120 is to control access to the secure information 110 from over the network. Further, the control module 120 is to at least one of read and modify the secure information 110 based on a request received over the network, regardless of at least one of an operating state of an operating system (OS) of the device 100 and a power state of the device 100.

For example, the control module 120 may receive the request even if the device 100 is not in an on power state and/or the OS has not yet loaded or is malfunctioning on the device 100. Thus, the control module 120 may receive the request and modify and/or transmit the secure information 110, even while the device 100 is an off state or a low power state. Examples of the low power state may include sleep, hibernate, etc. The OS may not have yet loaded when the device 100 is still booting up and the OS may malfunction upon encountering a critical error, such as one that causes the OS to crash or freeze.

The control module 120 may receive power from a power source (not shown) independently of the device 100, in order to receive the request and/or access the secure information 110 when the device 100 is powered down. Further, the control module 120 may include software, such as its own OS and/or an application, which allows the control module 120 to receive, interpret and carry out the request as well as interface with the network and the secure information 110. In one embodiment, the software of the control module 120 may also carry out operations at a network layer, e.g. layer 3 of the Open Systems Interconnection (OSI) model or Internet Protocol model. At the network layer, the control module 120 may be able to communicate with an element (not shown) in the network, as explained in greater detail below with respect to FIG. 2.

Figure 2:
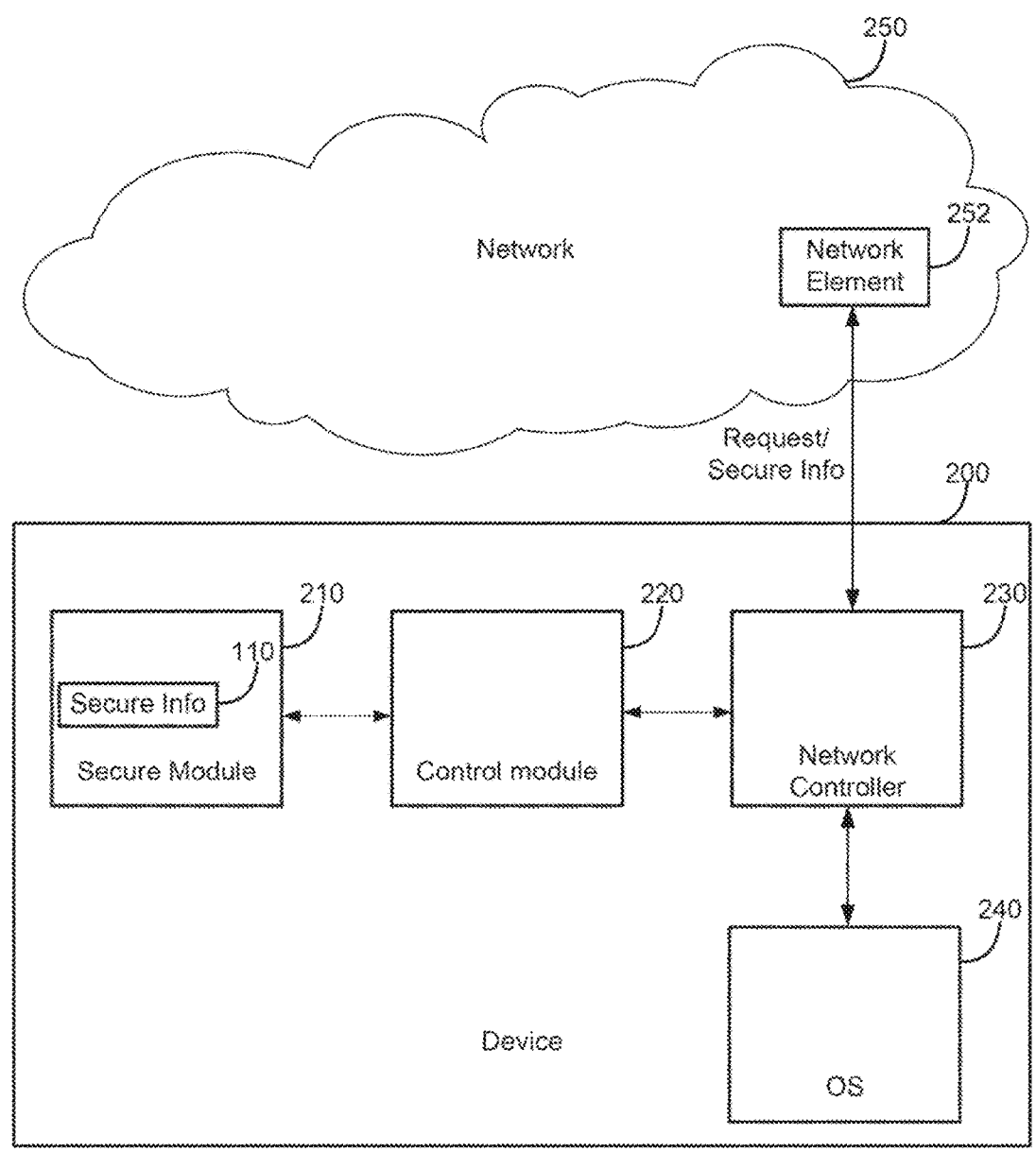
FIG. 2 is another example block diagram of a device accessing secure information over a network.

FIG. 2 is another example block diagram of a device 200 for accessing secure information 110 over a network 250. The device 200 may be included in any type of user device that connects to a network, such as a secure microprocessor, a notebook computer, a desktop computer, an all-in-one system, a slate computing device, a portable reading device, a wireless email device, a mobile phone, and the like. In the embodiment of FIG. 2, the device 200 includes a secure module 210, a control module 220, a network controller 230, and an OS 240.

The control module 220 of FIG. 2 may be similar to the control module 120 of FIG. 1. A network 250 includes a network element 252. Examples of the network element 252 include a host, router, switch, gateway, domain controller, a server, and the like. The network controller 230 may be any type of device that connects to a network, such as a network interface card. For example, the network controller 230 may include electronic circuitry to communicate using a physical layer and data link layer standard such as Ethernet, Wi-Fi, Token Ring, etc. The network controller 230 may receive power from a power source (not shown) independently of the device 200, in order to operate when the device 200 is powered down.

In FIG. 2, the network controller 230 may connect the device 200, including the control module 220, to the network 250. The control module 220 may communicate with the network element 252 via the network controller 230, to receive the request from and/or to send information to the network element 252. The network element 252 and the control module 220 may communicate via a management protocol, such as web Services-Management (WS-Management), Simple Network Management Protocol (SNMP), and the like.

The secure module 210 is to store the secure information 110. The secure module 210 may be part of a machine-readable storage medium, such as any type of electronic, magnetic, optical, or other physical storage device capable of storing information, like data or instructions. Example of the machine-readable storage medium include Random Access Memory (RAM), an Electrically Erasable Programmable Read-Only Memory (EEPROM), a storage drive, a Compact Disc Read Only Memory (CD-ROM), and the like. Further, the secure module 210 may also be part of a secure processor such as a Trusted Platform Module (TPM), software such as a hypervisor or OS, a basic input/output system (BIOS) (not shown), and/or part of the control module 220.

The control module 220 at least one of reads from and writes to the secure module 210 based on a request received over the network 250 via the network element 252. In one embodiment, the secure module 210 may be not visible and/or not accessible by the OS 240. Hence, a security of the secure information 110 may be increased by reducing a number of components that may access the secure information 110.

Before the control module 220 carries out the received request, the control module 220 may first validate that the network element 252 is a trusted party. The term trusted party may refer to any party that is authorized to access and/or modify the secure information 110. For example, the network element 252 may verify its identity to the device 200 by sending its identification in the form of a digital certificate, where the digital certificate may include a name of the network element 252, a trusted certificate authority (CA) and/or the network element's 252 encryption key. The control module 220 may then contact the CA to confirm the validity of the digital certificate before proceeding. Upon the identity of the network element 252 being authenticated, the control module 220 may carry out the request of the network element 252 to access and/or modify the secure information 110.

For example, the control module may read and transmit at least part of the secure information 110 to the network element 252, clear at least part of the secure information 110 and/or write new information received from the network element 252 to the secure module 210 as at least part of the secure information 110. The network element 252 may, for example, be controlled by an administrator to remotely update, migrate, or manage the secure information 110.

Further, the device 200 may also verify its identity to the network element 252, either before or after the network element 252 verifies its identity to the device 200. For example, the network element 252 may ask the device 200 to confirm its identity before the network element 252 sends any confidential information to the device 200, such as information to be stored at the secure module 210. Further, the network element 252 may seek to confirm the identity of the device 200 before reading the secure information 110.

The control module 220 may, for example, send a digital certificate, a globally unique identifier (GUID), a MAC address, and the like, to authenticate its identity to the network element 252. Further, control module 220 may convey the identity of the device 200 to the network element 252 independently of a user using the device 200. The control module 220 may carry out any of the above operations, such as communicating with the network element 252 and/or the secure module 210, without notifying the user. Thus, a user of the device 200 may not be disturbed when the network element 252 seeks to access the secure information 110. In addition, the network element 252 may not be inconvenienced by waiting for an action from the user before accessing the secure information 110. Further, as the OS 240 is not involved in accessing the secure information 110, security or integrity of a computing platform of the device 200 may be improved.

The above process for authenticating identities and/or sending secure information over the network 250 may carried out using a secured connection for security, such as by using a cryptographic protocol. Examples of the cryptographic protocol may include Transport Layer Security (TLS), Secure Sockets Layer (SSL) and the like.

In one embodiment, the control module 220 may communicate with the network controller 230 along a separate communication channel, such as an always available out-of-band communication channel not accessible by the OS 240. While the control module 220 is shown to be separate, embodiments may have the control module 220 included in, for example, a BIOS. Alternatively, a hypervisor (not shown) may run both the control module 202 and the OS 210. Thus, embodiments allow access to the secure information 110 regardless of an operating state of the OS 240 of the device and/or a power state of the device 200.

Figure 3:
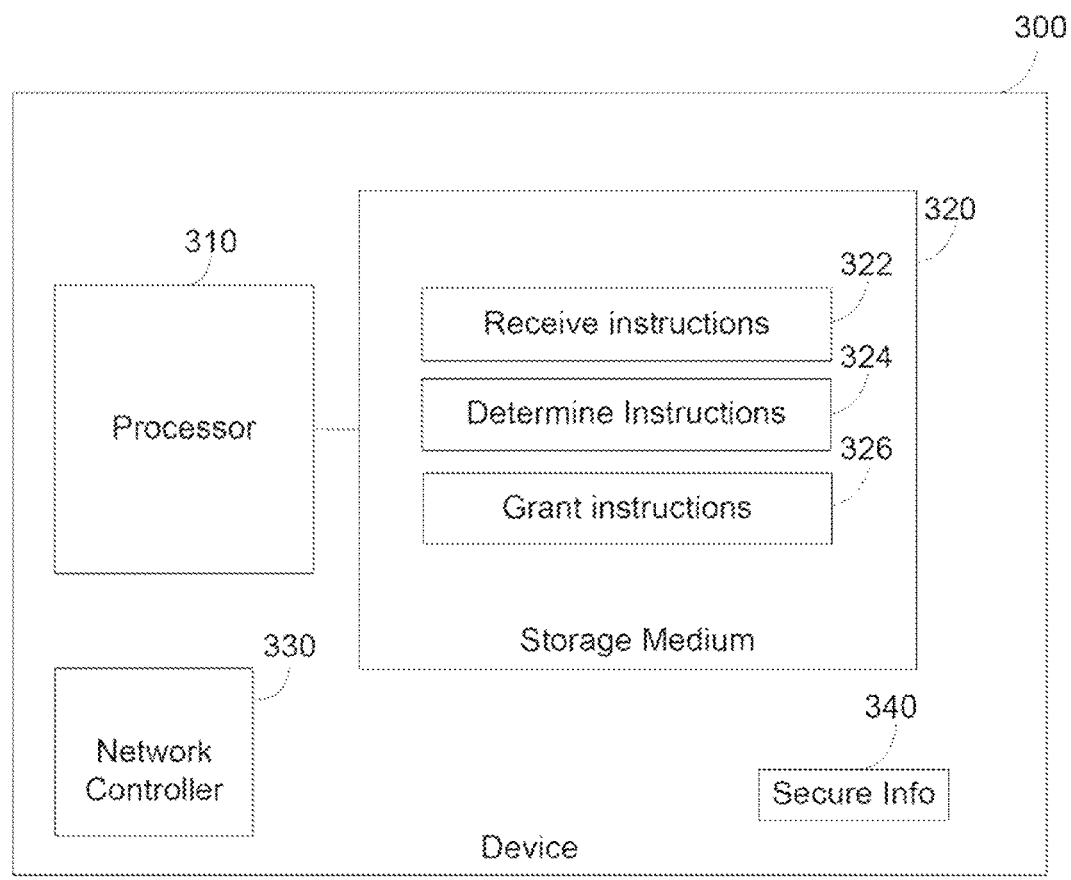
FIG. 3 is an example block diagram of a computing device including instructions for accessing secure information over a network.

FIG. 3 is an example block diagram of a computing device 300 including instructions for accessing secure information over a network. In the embodiment of FIG. 3, the computing device 300 includes a processor 310, a machine-readable storage medium 320, a network controller 330 and secure information 340. The network controller 330 and the secure information 340 of FIG. 3 may respectively be similar to the network controller 230 of FIG. 2 and the secure information 110 of FIGS. 1 and 2. The machine-readable storage medium 320 further includes instructions 322, 324 and 326 for accessing secure information over a network.

The computing device 300 may be, for example, a chip set, a notebook computer, a slate computing device, a portable reading device, a wireless email device, a mobile phone, or any other type of user device capable of executing the instructions 322, 324 and 326. In certain examples, the computing device 300 may include or be connected to additional components such as memories, sensors, displays, etc.

The processor 310 may be, at least one central processing unit (CPU), at least one semiconductor-based microprocessor, at least one graphics processing unit (GPU), other hardware devices suitable for retrieval and execution of instructions stored in the machine-readable storage medium 320, or combinations thereof. The processor 310 may fetch, decode, and execute instructions 322, 324 and 326 to implement accessing secure information over a network. As an alternative or in addition to retrieving and executing instructions, the processor 310 may include at least one integrated circuit (IC), other control logic, other electronic circuits, or combinations thereof that include a number of electronic components for performing the functionality of instructions 322, 324 and 326.

The machine-readable storage medium 320 may be any electronic, magnetic, optical, or other physical storage device that contains or stores executable instructions. Thus, the machine-readable storage medium 320 may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium 320 can be non-transitory. As described in detail below, machine-readable storage medium 320 may be encoded with a series of executable instructions for accessing secure information over a network.

Figure 4:
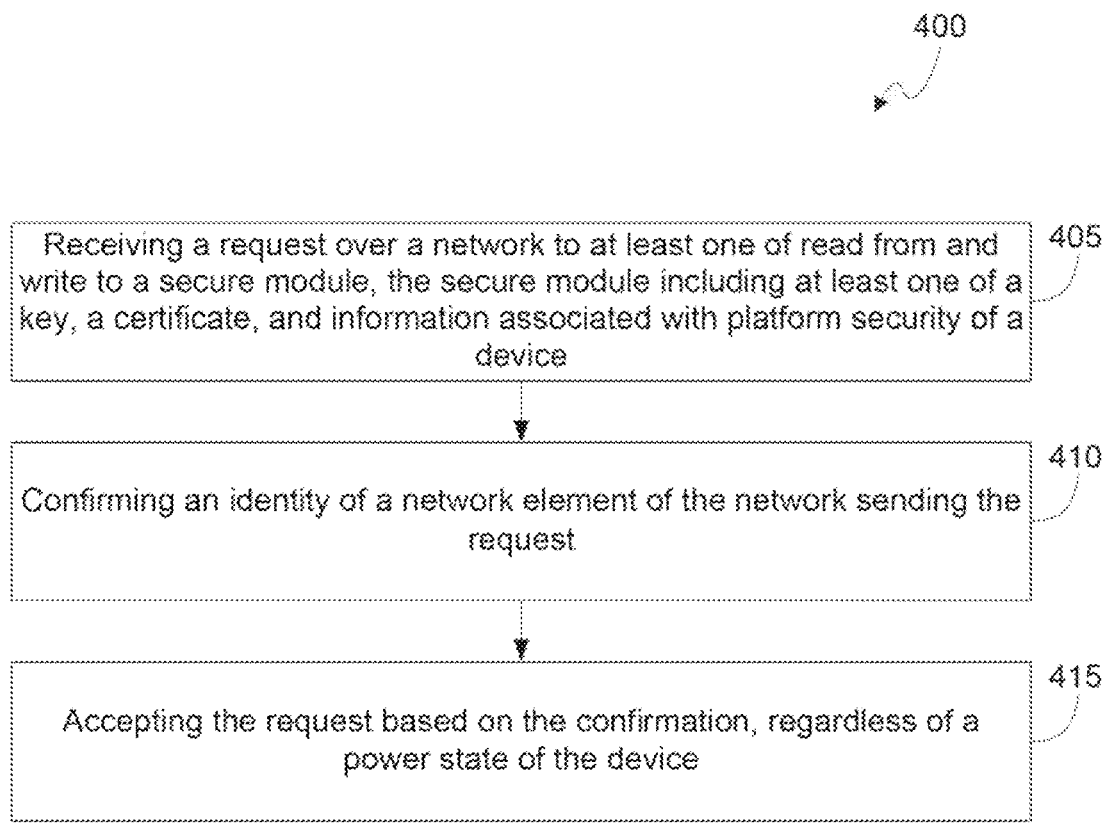
FIG. 4 is an example flowchart of a method for accessing secure information over a network.

Moreover, the instructions 322, 324 and 326 when executed by a processor (e.g., via one processing element or multiple processing elements of the processor) can cause the processor to perform processes, such as, the process of FIG. 4. For example, the receive instructions 322 may be executed by the processor 310 to receive a request from a network element (not shown) over a network (not shown) independently of at least one of a power state of the device 200 and an operating state of an operating system (OS) (not shown) of the device 300. The request relates to accessing secure information 110 of the device 300. The request may be received from the network element over the network along a first communication channel (not shown) separate from a second communication channel (not shown) used by the OS to communicate over the network.

The determine instructions 324 may be executed by the processor 310 to determine an identity of the network element sending the request. Examples of determining the identity are provided above with respect to FIGS. 1 and 2. The grant instructions 326 may be executed by the processor 310 to grant access to the secure information 110 of the device 300 based on the determined identity. For example, the device 300 may grant access if the determined identity is recognized as an identity with permission to access the secure information. The determined identity may be compared with an internal database (not shown) of the device 300 and/or an external certification authority (CA). Examples of the secure information 340 include a key, a certificate and/or information associated with platform security of the device 300.

FIG. 4 is an example flowchart of a method 400 for accessing secure information over a network. Although execution of the method 400 is described below with reference to the device 200, other suitable components for execution of the method 400 can be utilized, such as the device 100. Additionally, the components for executing the method 400 may be spread among multiple devices (e.g., a processing device in communication with input and output devices). In certain scenarios, multiple devices acting in coordination can be considered a single device to perform the method 400. The method 400 may be implemented in the form of executable instructions stored on a machine-readable storage medium, such as storage medium 320, and/or in the form of electronic circuitry.

At block 405, the device 200 receives a request over the network 250 to access the secure module 210 having the secure information 110. The secure information 110 includes at least one of a key, a certificate, and information associated with platform security of the device 200. Next, at block 410, the device 200 confirms an identity of the network element 252 of the network 250 sending the request. Then, at block 415, the device 200 accepts the request based on the confirmation, regardless of a power state of the device. Further, device 200 also accepts the request at block 415 based on the confirmation, regardless of an operating state of the OS 240 running on the device 200. For example, the device 200 accepts the request if the identity of the network element 252 is confirmed to be an identity with permission to access the secure information 110. The request is received via a management protocol over the network 250 from the network element 252, as explained above with respect to FIGS. 1 and 2.

According to the foregoing, embodiments provide a method and/or device for allowing for greater access to secure information of a device while maintaining an integrity or security of the secure information. For example, embodiments may allow the secure information to be managed, migrated, updated and like, over a network, independently of an OS of the device and/or a power state of the device.

I claim:

1. A device comprising:
    a memory;
    a control module stored in the memory of the device to:
        control access to secure information from over a network;
        determine whether a hardware network element is a trusted party by confirming a validity of a digital certificate received via a certificate authority, wherein the digital certificate is received using a cryptographic protocol;
        send a different digital certificate using the cryptographic protocol to the hardware network element to authenticate an identity of the control module; and
        communicate with a network controller along an out-of-band communication channel independent of the state of an operating system (OS) of the device and a power state of the device, wherein the network controller is to connect the device to the network;
    wherein the control module is included in a basic input/output system (BIOS) and stored in the memory to at least one of read and modify the secure information located in a secure area based on a request received over the network in response to the hardware network element being determined to be a trusted party and the control module being authenticated, regardless of the operating state of the OS of the device and the power state of the device, wherein the control module is to receive the request over the network via the network controller;

a secure module stored in the memory including the secure area to store the secure information.

2. The device of claim 1, wherein the control module at least one of reads from and writes to the secure module based on the request received over the network.

3. The device of claim 1, wherein the secure module is at least one of not visible and not accessible by the OS.

4. The device of claim 1, further comprising: a hardware network element to at least one of authenticate an identity of the hardware network element to the device and to modify the secure information over the network via the control module.

5. The device of claim 4, wherein the control module is to convey the identity of the device to the hardware network element independently of a user using the device.

6. The device of claim 4, wherein the hardware network element and the control module are to communicate via a management protocol.

7. The device of claim 1, wherein the secure information includes at least one of a key, a certificate, and information associated with platform security of the device.

8. The device of claim 1, wherein, the control module is included in the BIOS and a hypervisor.

9. A method, comprising:

receiving, by a network controller from a network element, a request over a network to access a secure module having secure information located in a secure area, the secure information including at least one of a key, a certificate, and information associated with platform security of a device;

sending, by a control module, a first digital certificate using a cryptographic protocol to the network element to authenticate an identity of the control module;

confirming, by the control module included in a basic input/output system (BIOS), an identity of the network element of the network sending the request by confirming a validity of a second digital certificate received by the network controller from the network element via a certificate authority, wherein the second digital certificate is received via the cryptographic protocol, and wherein the network controller communicates with the control module:

along an out-of-band communication channel; and independent of an operating state of an operating system (OS) of the device and a power state of the device;

accepting the request based on the confirmation, wherein the request is received regardless of the power state of the device; and at least one of reading and modifying, by the control module, the secure information while located in the secure area regardless of the operating state of the OS of the device and the power state of the device in response to the identity of the network element being confirmed and the control module being authenticated.

10. The method of claim 9, wherein the request is received regardless of an operating state of an operating system running on the device, and the request is received via a management protocol over the network from a network element.

11. A non-transitory computer-readable storage medium storing instructions that, if executed by a processor of a device, cause the processor to:

send, by a control module of the device, a first digital certificate using a cryptographic protocol to a network element to authenticate an identity of the control module in response to a request over a network from the network element relating to accessing secure information stored in a secure area of the device;

determine, by the control module included in a basic input/output system (BIOS) of the device, an identity of the network element sending the communication by confirming a validity of a second digital certificate received by the network controller from the network element via a certificate authority, wherein the second digital certificate is received via the cryptographic protocol, and wherein the network controller communicates with the control module:

along an out-of-band communication channel; and independent of a power state of the device and an operating state of the operating system (OS) of the device;

grant access to the secure information of the device based on the determined identity; and modify, by the control module based on the request received from the network element, the secure information while the secure information is stored in the secure area regardless of at least one of the power state of the device and the operating state of the OS of the device in response to the identity of the network element being confirmed and the control module being authenticated.

12. The non-transitory computer-readable storage medium of claim 11, wherein the secure information includes at least one of a key, a certificate, and information associated with platform security of the device.

13. The non-transitory computer-readable storage medium of claim 11, wherein the request is received from the network element over the network along a first communication channel separate from a second communication channel used by the OS to communicate over the network.

\* \* \* \* \*